(12) United States Patent  (10) Patent No.: US 8,737,971 B2
van Rooyen et al.  (45) Date of Patent: May 27, 2014

(54) UNIVERSAL PERSONAL DIAGNOSTICS PLATFORM

(76) Inventors: Pieter van Rooyen, San Diego, CA (US); Rita van Rooyen, San Diego, CA (US)

( * ) Notice: Subject to any disclaimer, the term of this patent is extended or adjusted under 35 U.S.C. 154(b) by 117 days.

(21) Appl. No.: 13/549,444

(22) Filed: Jul. 14, 2012

(65) Prior Publication Data

US 2013/0017807 A1  Jan. 17, 2013

Related U.S. Application Data

(60) Provisional application No. 61/508,662, filed on Jul. 17, 2011.

(51) Int. Cl.
*H04M 3/42*  (2006.01)
*G06F 19/00*  (2011.01)

(52) U.S. Cl.
CPC ..................... *G06F 19/00* (2013.01)
USPC ........ 455/414.1; 455/557; 600/544; 600/300; 705/3

(58) Field of Classification Search
CPC ...................................... G06F 19/00
USPC ........ 455/414.1, 557; 600/544, 300; 709/203, 709/217, 223; 705/3
See application file for complete search history.

(56) References Cited

U.S. PATENT DOCUMENTS

| 8,583,728 B2* | 11/2013 | Irwin et al. ............... 709/203 |
| 2010/0010832 A1* | 1/2010 | Boute et al. .................. 705/3 |
| 2012/0029303 A1* | 2/2012 | Shaya ........................ 600/300 |
| 2012/0330178 A1* | 12/2012 | Kraft et al. .................. 600/544 |

\* cited by examiner

*Primary Examiner* — David Q Nguyen
(74) *Attorney, Agent, or Firm* — Clause Eight IPS; Michael Catania

(57) ABSTRACT

A universal personal diagnostics platform that connects to a mobile communication device such as a cellular phone or a smartphone. A universal connector attaches the universal personal diagnostics platform to a smartphone and consists of an optical and/or electrochemical reader that detects an analyte concentration in a blood sample.

19 Claims, 5 Drawing Sheets

UNIVERSAL PERSONAL DIAGNOSTICS PLATFORM

CROSS REFERENCE TO RELATED APPLICATION

The present application claims priority to U.S. Provisional Patent Application No. 61/508,662, filed on Jul. 17, 2011, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is in the technical field of health care. More particularly, the present invention is in the technical field of analyte detection. More particularly, the present invention is in the technical field of using a mobile phone in conjunction with an analyte detector to enable health monitoring and tracking via the cellular telephone network and to connect to other wireless and internet enabled services.

2. Description of the Related Art

The prior art discusses various medical devices.

BRIEF SUMMARY OF THE INVENTION

In a broad embodiment, the present invention is a first of its kind blood testing system and self-monitoring solution for preventative and chronic diseases management that connects directly to a cellular connected device. The idea being that patients can be encouraged to better manage their health by being rewarded for adhering to good testing habits with an effortless testing procedure that automatically transfers and stores all test data, and thereby making personal health data ubiquitous and malleable for the patient, their doctors and health network.

One aspect of the present invention is a personal diagnostics platform (PDP) that connects to a cellular enabled cellphone such as a smart phone. The PDP is realized with a universal connector that attaches to a smartphone and consist of an optical and/or electrochemical reader that detect analyte concentration. Analytes are introduced to the reader via a lateral flow device (LFD) or an electrochemical device (ECD) for chromatographic assays. These assays can be anything from glucose level testing, A1c, kidney function, cardiac markers or vitamin deficiency tests. A blood sample of the patient is applied to the LFD or ECD by using a lancet. The PDP further has a wireless enabled functionality, such as Low Power Bluetooth or ANT+, to connect to a wireless enabled weight scale, heart rate/ECG monitors or wireless enabled blood pressure monitors. The data collected by the PDP, analyzed and then transmitted to the mobile phone via a USB, RS232, RS485 or IPHONE™ doc connector.

An application on the smart phone then displays the data and gives the user a number of options. Some of the options are to view the current result, view the history of test results, share the information with a medical network, store the data in a personal health record or share the information with a physician. The user will also be able to order new LDF or ECD assays from the mobile phone. The user can further make an appointment with a physician or call a health care expert which will be able to view the recorded health record of the patient. An application on the physician's cellular phone (running for example the IOS, ANDROID or WINDOWS operating systems) or tablet computer (such as an iPad) will allow the physician to view the patient's health care record and give advice to order new assays for the patient to test. In case the physician wants to prescribe medication to the patient, the physician can do that directly from his application running on his tablet computer and send the prescription to the drug store closest to the patient. Using the application on the physician's tablet, the physician can query the health insurance company to get remunerated for his services.

The application on the patient's mobile phone will further give the patient the option to view advertisement related to his health profile in order to live a healthier lifestyle. A data analysis server will perform an analysis on the patients' health care data and determine trends and suggest a better diet and life style choices. This may include interacting with an Ad server, merging data with other electronic health records, having a Personal Health Tamagotchi, and interacting with condition/disease specific blogs or medical networks. Data connections between the accessory and smartphone can include a USB, iPHONE dock connector, phone-internal camera, phone audio jack plug and/or wireless (BLUEETOOTH, cellular, wireless LAN technology).

A primary advantage of the present invention is decentralization of the pathology lab and patient empowerment.

Another advantage of the present invention is a lab in a consumer's pocket allows for maximum flexibility in personal self-monitoring.

Another advantage of the present invention is universal connectivity.

Another advantage of the present invention is automatic establishment of a personal electronic health record that eliminates data exhaust and increases the utility of health charts with a large medical network including different specialist physicians.

Another advantage of the present invention is a convergence of fragmented health care market: testing across different conditions and chronic diseases through one device; and health information sharing with members of medical network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
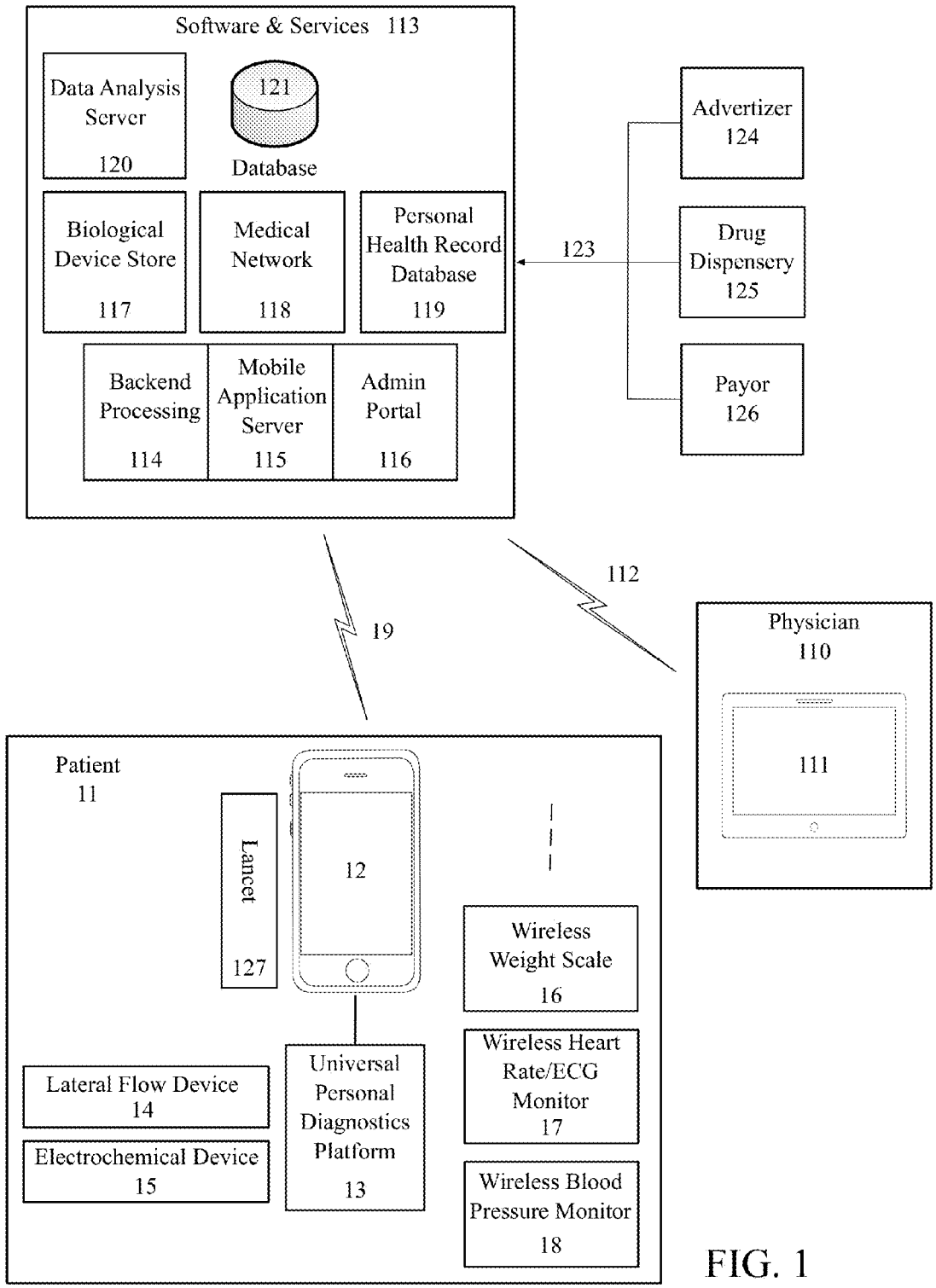
FIG. 1 is a block diagram of the system architecture of the Universal Personal Diagnostics System.

Referring now to the invention in more detail, in FIG. 1 there is shown a patient 11 that has in his/her possession a mobile communication device 12 with a software application. The mobile communication device is preferably a smartphone or a cellular phone. Alternatively, the mobile communication device is a tablet computing device. The mobile communication device 12 is wirelessly connected to the Internet. A universal personal diagnostics platform 13 is connected to the mobile communication device 12. A lateral flow device 14 or a electrochemical device 15 can be inserted into the universal personal diagnostics platform 13. The data connection between the optical/and or electrochemical reader and the mobile communication device is preferably a USB connection. Alternatively, the data connection between the optical/and or electrochemical reader and the mobile communication device is an IPHONE dock connector, a phone's internal camera, a smartphone's audio jack plug or a wireless connection using BLUETOOTH, cellular, WLAN or another low-power wireless communication technology. A wirelessly enabled weight scale 16, a wirelessly connected heart rate/ECG monitor 17 and a wireless blood pressure monitor can connect to universal personal diagnostics platform 13 that is controlled by mobile communication device 12.

There exists a wireless connection 19 to a set of software and services servers 113. The software and services servers 113 consists of a mobile application server 115 where back-end processing is performed by 114. An admin portal 116 is available to view status of the remote servers. There also preferably is a biological device store 117, a medical network 118, and a personal health record database 119. A data analysis server is present where data received from mobile communication device 12 is analyzed. Test results are automatically transferred to a secure database 121 for storage. There also is preferably a physician or health care worker 110 with a tablet PC or similar device 111 that wirelessly connects to the software and services servers 113.

There also preferably is an advertising server 124, a drug dispenser server and database 125 and a payor, such as a health insurance company 126 that connect to the software and services servers 113 via an Ethernet or similar connection 123.

Figure 2:
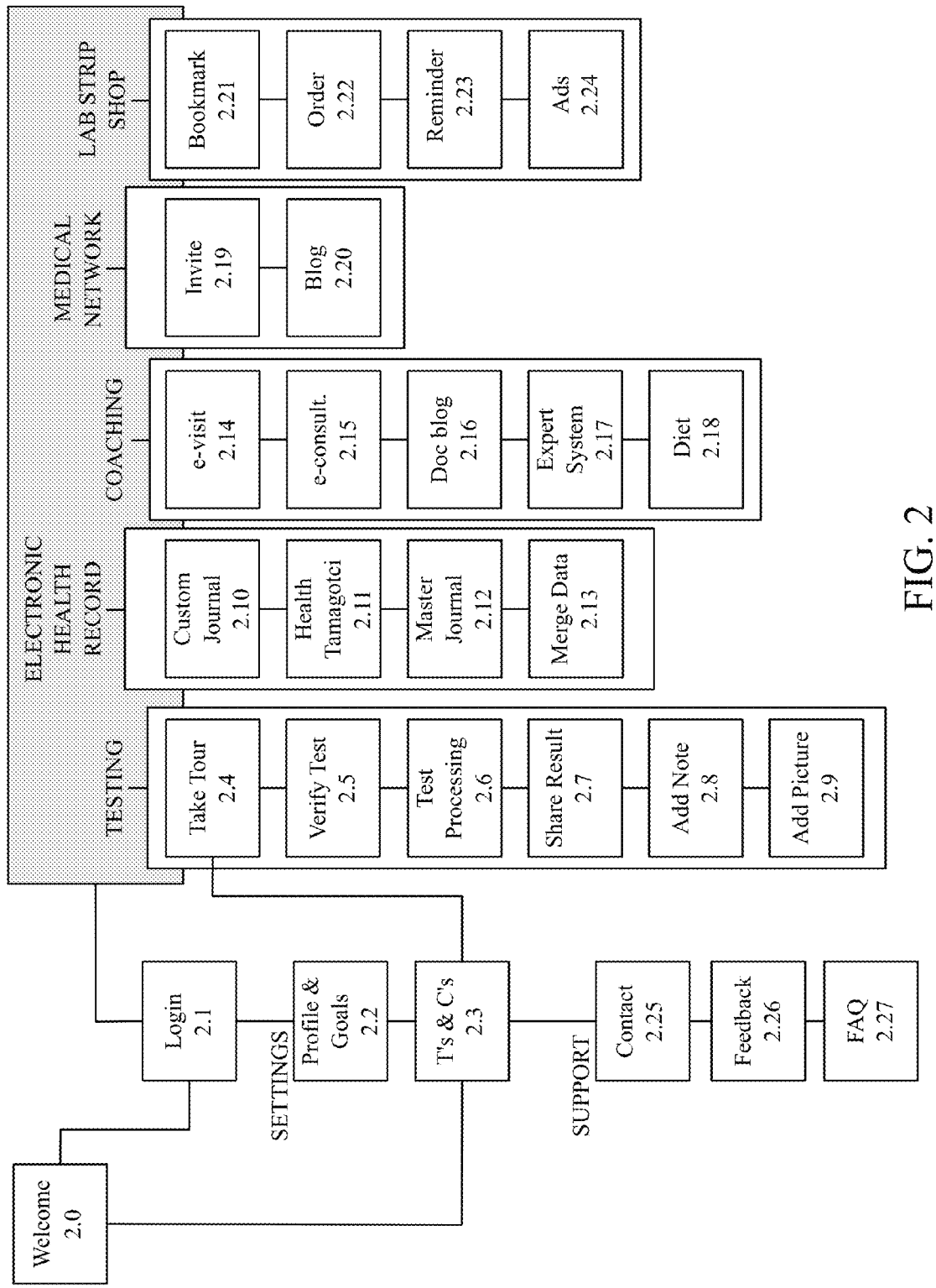
FIG. 2 is a block diagram of a software application that is available on a patient's mobile phone.

Referring to FIG. 2, a mobile phone software application that operates on the mobile communication device 12 preferably operates with the following procedures.

2.0 Welcome Screen.

Splash Screen provides space for branding and advertising (clickable banners).

2.1 Login.

User has the option to login, or to create a new user account, which works as a roaming user profile on both handheld and desktop devices. Logging-in on the handset is not obligatory for the purpose of conducting a test, but required in order to share data or to engage with other members of the medical network.

Settings 2.2 Profile and Goal Settings

User needs to create a profile for the purpose of user identification and has the option to add a screen name, an email address for in-network communication, as well as a shipping address for delivery of test strips, and registration with PayPal for direct payment. In the Profile section the user also specifies user physical attributes (gender, age, weight) and his/her overall health condition and personal health goals. Conditions and diseases of the user will flag the user for a specific patient group of the application. The goal settings activity helps the user to establish clear health priorities, and enables physicians to focus on an attainable plan of action. A physician or medical professional of the user's medical network agrees the patient's individual target range for any test result, which is then also reflected in the patient's Custom Journal (Dashboard 2.10). The settings will reflect such an agreement by a health professional. In the settings feature of the application the user can set a language preference. (EN, ES).

2.3 Terms and Condition

User has to agree to the Terms and Conditions, as well as the Privacy Policy before any tests can be conducted, and alert messages remind the user to comply.

Testing Features 2.4. Take Tour

A picture guide allows the user to learn about the features, navigation, and benefits of Pocket Lab application in a graphically supported slideshow.

2.5 Verify Test

After user has attached the reader to the Smartphone and has inserted a test strip into the reader, the application automatically turns on the reader and verifies whether a proper connection has been established. The test strip contains markers for the reader to routinely identify the type of test(s). The screen displays this information to the user. The test strip can also include a unique identifier, such as an RF id chip to identify the type of test, the patient and/or to pair the reader and the test strip for quality control and security reasons.

2.6 Test Processing and Result Display

The application indicates that the diagnosis is in progress. The processing time is between 3 and 30 seconds depending on the type of test and the blood sample size. The application displays the result within ranges, calculates an average level over a period of time and displays graphs and charts of past test results whenever appropriate. The application also allows for the result to be displayed in large letters for better reading. All test results are automatically transferred and stored to a secure server for contingent trend analysis.

2.7 Share Result

Option for user to share test results either via application internal messaging or via an email to a physician or other members of the user's medical network to discuss any unusual or abnormal blood tests results, or to obtain a professional interpretation and diagnosis.

2.8 Add Note

User defined notes can be added to each blood test result, such as for example, daily activities or food choices and are stored in the user's Master Journal (2.12 Electronic Health Record)

2.9 Add Picture

User can add a photo of food eaten to the test result. The picture is taken with the Smartphone camera. The pictures are time-stamped and thereby automatically synch up with test results and are stored in the user's Master Journal (2.12 Electronic Health Record).

Electronic Health Record (EHR) Features 2.10 Custom Journal (Dashboard)

The custom journal (dashboard) is a subset of the Master Journal (2.12) and only displays certain records of the Master Journal that fall within user defined time, date, individual goal and note range criteria. The health dashboard is a toolset to provide users with easy access to a wealth of their electronic health record (EHR) data that is being captured locally on the Smartphone and saved to a server, in a visual and usable format, whenever they need it. At its core it will display relevant test result information alongside relevant national metrics, for example best practice from members of the medical network and specialist associations, as this information becomes available. The dashboard also includes out-of-range alerts, such as for example hypo indicator alerts for diabetic patients, and other condition-pertinent health indicators.

2.11 Health Tamagotchi

The health Tamagotchi is a virtual representation of the user himself in form of a character or avatar. As time passes, the Tamagotchi will evolve through various health stages (e.g. pre-diabetic, diabetic, cured, overweight, obese, thin, etc.), the results varying based on the gender and age of the user, his/her current state of health, the user's actions, and personal health goals. The Health Tamagotchi is being cared for by the user through his/her regular testing and is quantified by how these test results measure up against the personal health goals of the user. A Health Tamagotchi that has been cared for well enough will result in better health and more happiness, which is graphically expressed and sharable with other "patients-like-him". Based on the Tamagotchi's health and happiness level, the user is also ranked against other members' of his/her patient group. This feature allows the user to pay close attention to his/her state of being, and is conducive to improving themselves through social pressure and praise. Users turn their health into something of a virtual game, whereas the reward lies in the reality of a better health and a better life.

An implementation of the Health Tamagotchi is an app icon on a mobile phone that changes dynamically (change data pushed from server to mobile phone app). For instance, the app icon can change from green to orange to red depending on the current health status of the user.

2.12 Master Health Journal or Electronic Health Record (EHR)

The application automatically creates and updates an organized journal of the user's test results. Powerful sorting capabilities let users view their test results in many different ways and all records can be ordered by date, time and condition. The Health Record can be analyzed as all results are automatically organized by the system to detect trends and spot early warning signs. The data is searchable and Custom Health Journals (2.10) can be easily created from the Master Journal. Also previous Custom Journals can be recalled and displayed. A graphical interpretation of the data in form of a pie chart and a bar chart can be displayed and shared with other members of the user's medical network. User can optionally recycle accidentally deleted records back into the database. User can select their units of choice, for example, between mg/dl for blood glucose measurement recording.

2.13 Merge Data

The application provides the user with the possibility to merge the Master Health Journal (2.12) with other Electronic Health Record Systems, such as for e.g. Microsoft Vault.

Coaching Feature 2.14 e-visit

User can schedule a live virtual doctor's visit via messenger or skype. The user has access to view available time-slots for virtual appointments from the schedule of a list of health professionals that are part of the user's medical network (2.17).

2.15 e-consultation

User can request a diagnosis and interpretation of test results by contacting a physician either via direct messaging through the application, or via email.

2.16 Doc Blog

Physicians can blog about condition/disease-specific medical news to patients grouped by condition or disease.

2.17 Expert System

A robust expert system provides input scenarios, problem-solving mechanisms and output data based on a review of common practices and other user's anonymous test result functions. The goal is to automate knowledge-based data in the field of personal health care for less serious conditions, for example, a vitamin deficiency.

2.18 Diet

Physician is able to suggest a diet based on glycemic indices for most common foods including an automatic menu generator for the user.

Medical Network 2.19 Invite

User can invite specialists and other patients with similar conditions to his/her medical network. The invite settings include flags that allow the user to determine who within his/her network can query his or her Master Journal HER and who besides the user can commission additional test strips ordering (automatic prescription fulfillment).

2.20 Messaging

User can share and discuss results and experiences in condition- and disease-specific blogs with other members of the user's medical network and receive messages from physicians and other "patients-like-me.

Lab-Strip Shop 2.21 Bookmark

User and members of medical network (physicians) can bookmark/suggest tests for user.

2.22 Order

User can order/purchase test strips and test strip bundles through PayPal payment support. Test strips are delivered to user's mailing address.

2.23 Reminder

User is being reminded to purchase more test strips or to create standing order based on test strip consumption. System keeps track of which and how many strips have been ordered versus how many strips have been used.

2.24 Ads

An ad server places contextual advertisement based on the user's condition and test strip order.

Support 2.25 Contact

User can contact Pocket Lab directly for support via email.

2.26 Take Tour

A slideshow explains the entire testing process and application to the user by means of text and graphics.

2.27 Feedback

User can provide feedback and an evaluation of the product.

2.28 FAQ

Figure 3:
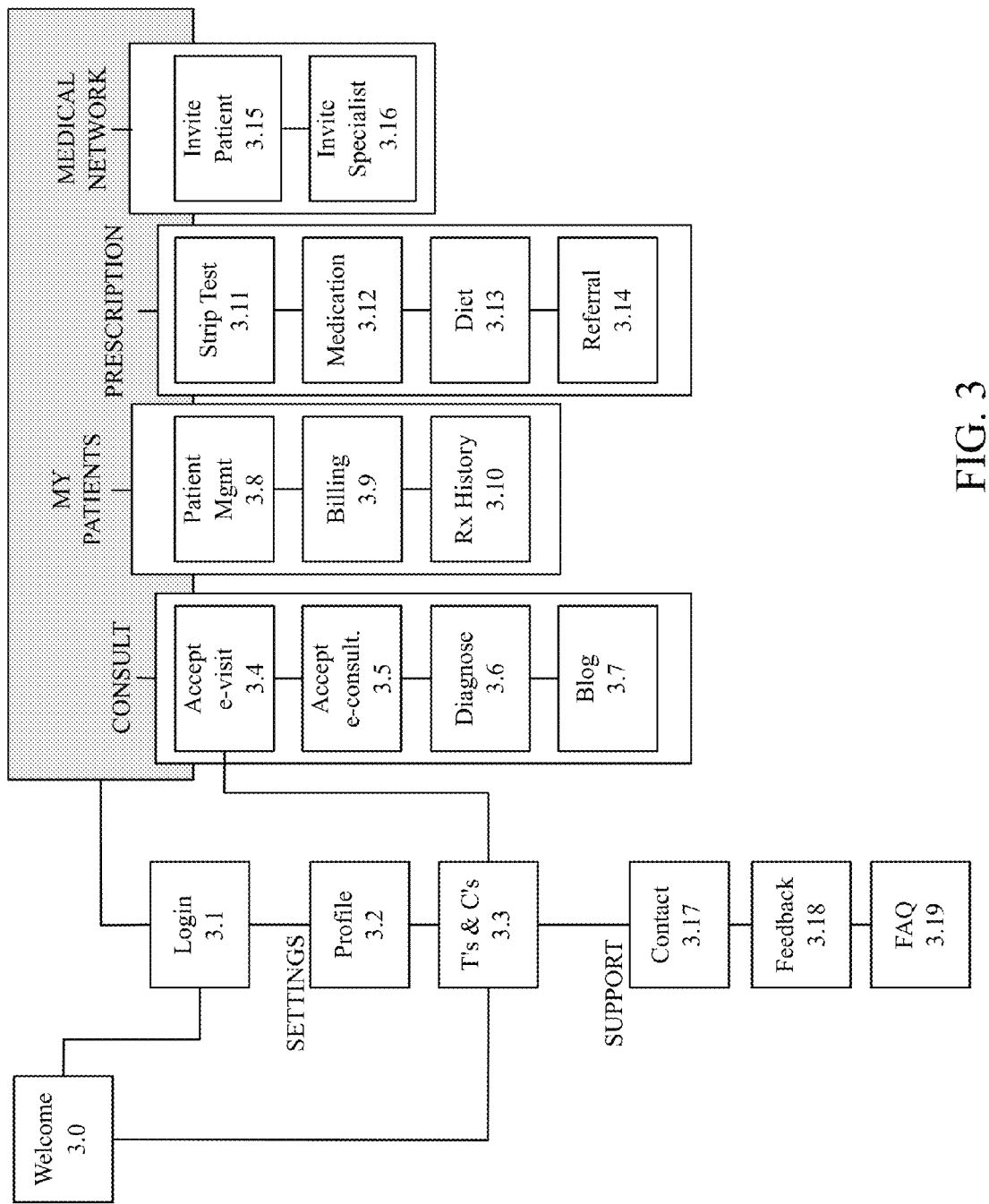
FIG. 3 is a block diagram of a software application that is available on a physician's tablet PC.

Frequently asked questions help the user to apply the assays and connect the reader, and help the user to navigate the application Referring to FIG. 3, a software application that operates on a physician's computing device preferably operates using the following procedures.

3.0 Welcome Screen

Splash Screen provides space for branding and advertising (clickable banners).

3.1 Login

Medical Professional User has the option to login, or to create a new user account, which works as a roaming user profile on both handheld tablet computers and desktop devices Settings 3.2 Profile User needs to create a profile for the purpose of user identification and is required to add an email address for in-network communication. In the Profile section the user also specifies user professional profile including gender, qualification, years of experience, specialty, present occupation). In the settings feature of the application the user can set a language preference.

3.3 Terms and Conditions

User has to agree to the Terms and Conditions, as well as the Privacy Policy before any tests can be conducted, and alert messages remind the user to comply.

Consult

3.4 Accept e-Visit

This feature allows the physician user to accept the invite of a patient to join his/her medical network and to schedule an e-Visit in form of a live virtual consultation via an online messaging system (like Skype).

3.5 Accept e-Consultation

This feature allows the physician user to accept the invite of a patient to join his/her medical network and to schedule an e-consultation to interpret test results via email communication.

3.7 Manage Schedule

The user manages a shared schedule of online office hours that can be accessed by patients of his medical network for direct patient visit scheduling.

My Patients

3.8 Patient Management

Lists patients by name and based on patient's authorization (invite with access permission) provides access to patient's Master Journal and Dashboard. Physician can create custom reports from the patients Electronic Health Record for analysis. The Master Journal provides access to the history of diagnosis for the patient through the user and all other medical professionals, and offers the option to add further reports and notes.

3.9 Billing Services

Statements for selected patient and other patient-related guarantors and billing history.

3.10 Prescription History

The user can review the prescription history of his patient that includes all prescriptions issued by either the user or other health professionals for this patient (3.12)

Prescription

3.11 Strip Test

User can prescribe strip tests to patients, which will automatically flag these tests in form of a reminder in the patient's Lab Strip Shop.

3.12 Medication

Physician can issue a prescription for medication, which is electronically delivered to patient's pharmacy of choice.

3.13 Diet

Physician suggests a diet based on patient's test results and personal health goals.

3.14 Referral

Physician can refer a patient to a specialist in his medical network.

Patient Network

3.15 Invite Patient

Invite new patients to Pocket Lab.

3.16 Invite Specialist/other Physician

User can invite specialist and other physicians to his Pocket Lab medical network, and can also suggest those medical professionals to patients via email.

3.17 Blog

User blogs condition-specific medical news to patient groups.

Support

3.25 Contact

User can contact Pocket Lab directly.

3.26 Take Tour

A slideshow explains the entire testing process and application to the user by means of text and graphics.

3.27 Feedback

User can provide feedback and an evaluation of the product.

3.28 FAQ

Frequently asked questions help the user to apply the assays and connect the reader, and help the user to navigate the application.

Figure 4:
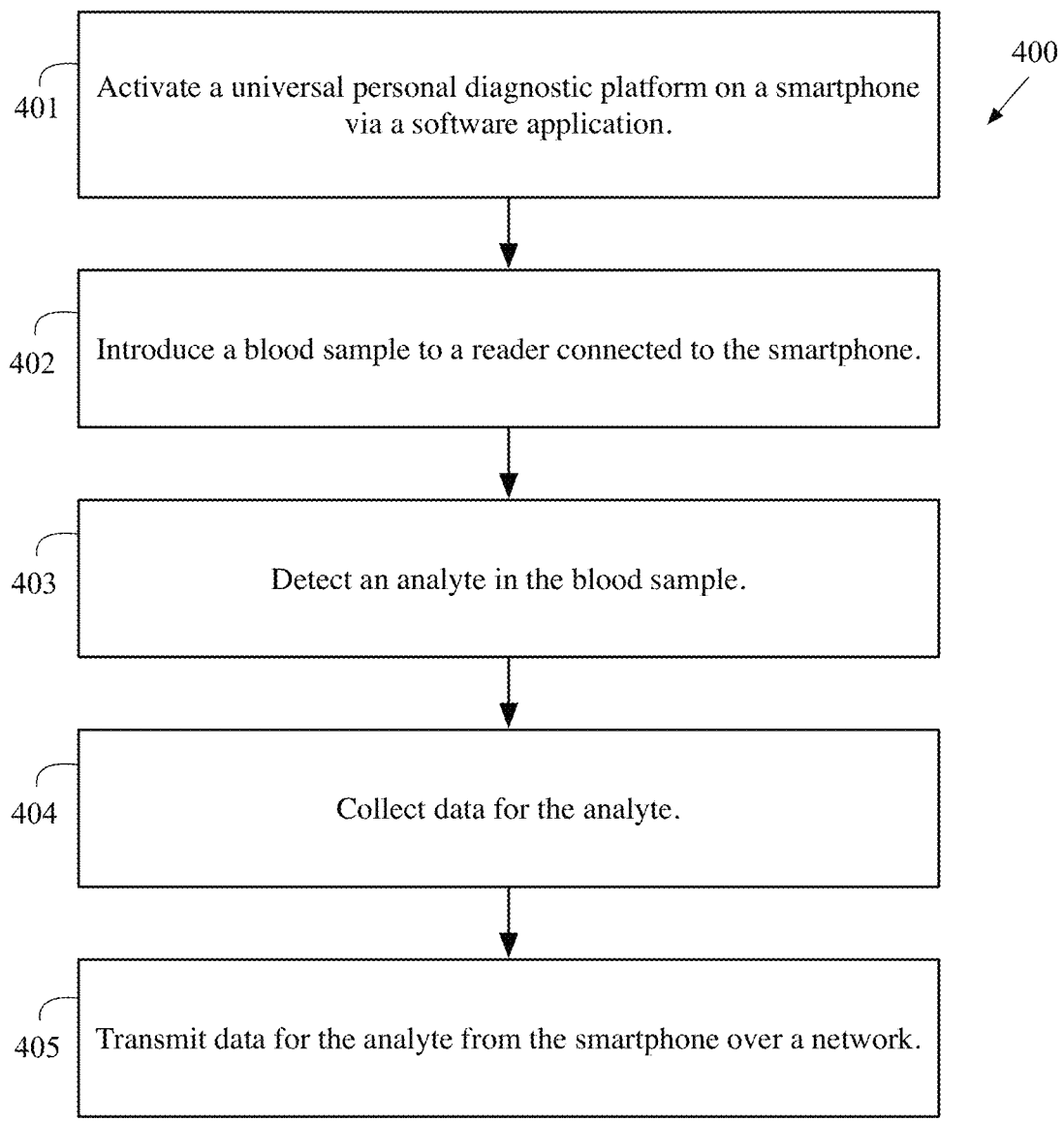
FIG. 4 is a flow chart of a preferred embodiment of a method of the present invention.

FIG. 4 is a preferred embodiment of a method 400 for universal personal diagnostics. At block 401, a universal personal diagnostic platform is activated on smartphone via a software application, preferably resident on the smartphone. At block 402, a blood sample is introduced to a reader connected to the smartphone. At block 403, an analyte is detected in the blood sample. At block 404, data for the analyte is collected. At block 405, data for analyte is transmitted from the smart phone over a network.

Figure 5:
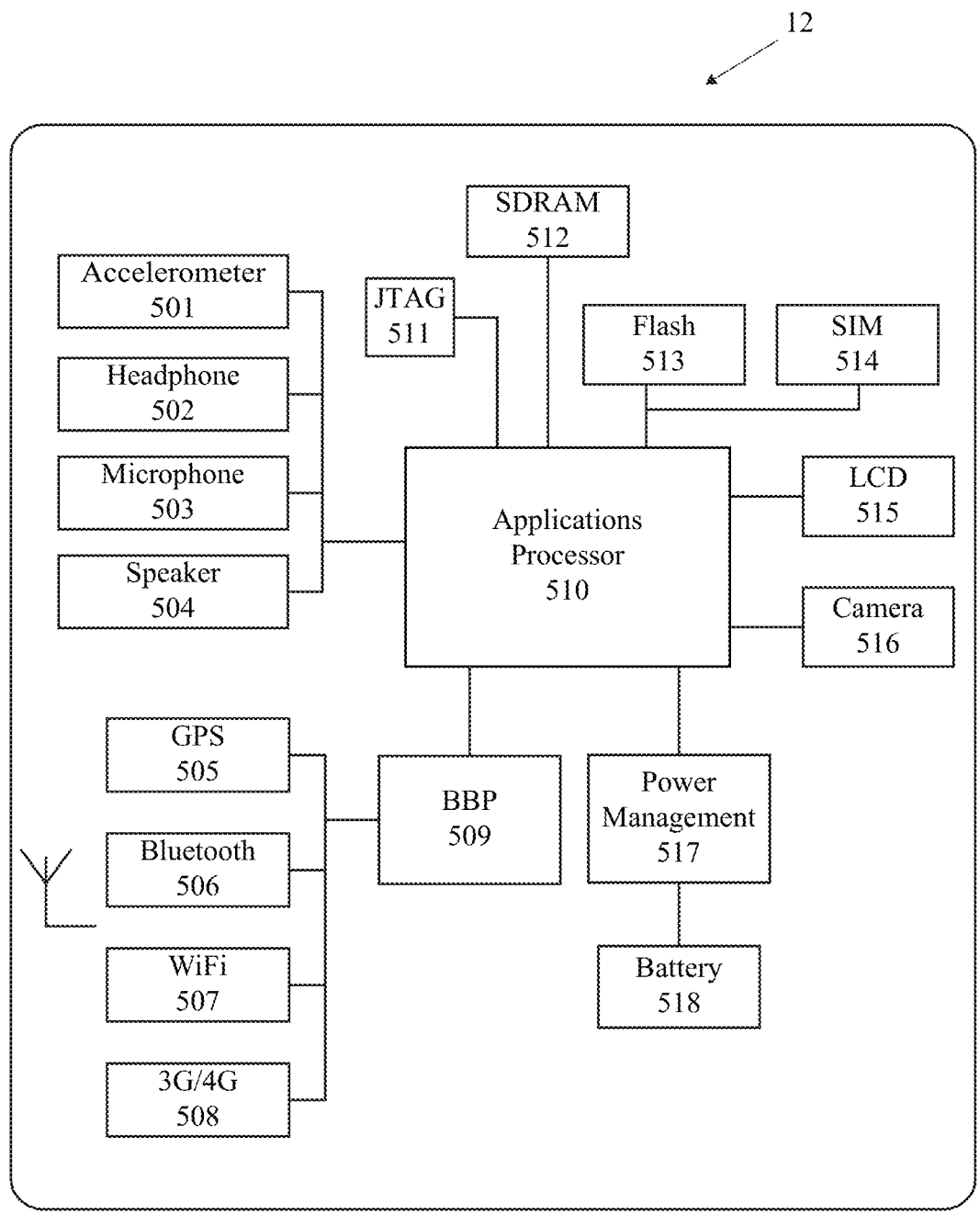
FIG. 5 is a block diagram of components of a mobile phone.

FIG. 5 is a block diagram of components of a conventional mobile phone 12 such as a smartphone. A conventional smartphone preferably includes an accelerometer 501, a head phone 502, a microphone 503, a speaker 504, a GPS chipset 505, a Bluetooth component 506, a WiFi component 507, a 3G/4G component 508, a BaseBand Processor (for radio control) 509, an applications processor 510, a JTAG (debugger) 511, a SDRAM memory 512, a Flash memory 513, SIM card 514, LCD display 515, a camera 516, a power management circuit 517 and a battery or power source 518.

The advantages of the present invention include, without limitation: 1) Decentralization of the pathology lab and patient empowerment; 2) Lab in consumer's pocket allows for maximum flexibility in personal self-monitoring; 3) Universal connectivity; 4) Automatic establishment of a personal electronic health record that eliminates data exhaust and increases the utility of health charts with a large medical network including different specialist physicians; and 5) Convergence of fragmented health care market: Testing across different conditions and chronic diseases through one device, and health information sharing with members of medical network.

In broad embodiment, the present invention is the first of its kind blood testing system and self-monitoring solution for preventative and chronic diseases management that connects directly to a cellular connected device. The idea being that patients can be encouraged to better manage their health by being rewarded for adhering to good testing habits with an effortless testing procedure that automatically transfers and stores all test data, and thereby making personal health data ubiquitous and malleable for the patient, their doctors and health network.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A universal personal diagnostic platform system comprising:
    a patient diagnostic device comprising a mobile communication device, a universal personal diagnostic platform physically connected to the mobile communication device, and a lateral flow device or an electrochemical reader inserted into the universal personal diagnostic platform, wherein the lateral flow device or the electrochemical reader is utilized for one of glucose level testing, A1c, kidney function, cardiac markers or vitamin deficiency tests;

a plurality of software and services servers;

a physician computing device; and at least one network for connecting the patient mobile communication device, the plurality of software and services servers, and the physician computing device.

2. The system according to claim 1 wherein the mobile communication device is a cellular phone or a smartphone, and the network is the Internet or a mobile phone network.

3. The system according to claim 1 wherein the plurality of software and services servers comprises a data analysis server, a mobile application server, a personal health record database, a database, an administration portal, a medical network, and/or a biological device store.

4. The system according to claim 1 wherein a connection between the mobile communication device and the a universal personal diagnostic platform is one of a USB connection, a IPHONE dock connector, an internal camera of the mobile communication device, an audio jack plug of the mobile communication device, or a wireless connection.

5. The system according to claim 1 further comprising a wireless enabled weight scale connected to universal personal diagnostic platform using a low power wireless communication protocol.

6. The system according to claim 1 further comprising a wireless enabled blood pressure monitor connected to universal personal diagnostic platform using a low power wireless communication protocol.

7. The system according to claim 1 further comprising a wireless enabled heart rate monitor connected to universal personal diagnostic platform using a low power wireless communication protocol.

8. The system according to claim 1 further comprising a wireless enabled ECG monitor connected to universal personal diagnostic platform using a low power wireless communication protocol.

9. The system according to claim 1 wherein the mobile communication device comprises a software application for utilizing the universal personal diagnostic platform.

10. The system according to claim 1 wherein the physician computing device is a tablet computer, a smartphone, a desktop computer or a laptop computer.

11. The system according to claim 1 wherein the universal personal diagnostic platform is configured to display the result within ranges, calculate an average level over a period of time and display graphs and charts of past test results.

12. The system according to claim 1 further comprising:

a wireless enabled weight scale connected to universal personal diagnostic platform using a low power wireless communication protocol;

a wireless enabled heart rate monitor connected to universal personal diagnostic platform using a low power wireless communication protocol a wireless enabled ECG monitor connected to universal personal diagnostic platform using a low power wireless communication protocol; and a wireless enabled blood pressure monitor connected to universal personal diagnostic platform using a low power wireless communication protocol;

wherein the universal personal diagnostic platform is configured to display the result within ranges, calculate an average level over a period of time and display graphs and charts of past test results.

13. A diagnostic device for connection to a mobile communication device to receive and transmit data over a network to at least one of a physician or a database, the device comprising:

a universal personal diagnostic platform;

a connector for connection to the mobile communication device;

an electrochemical device or a lateral flow device utilized for one of glucose level testing, A1c, kidney function, cardiac markers or vitamin deficiency tests; and a mobile phone software application;

wherein the universal personal diagnostic platform is physically connected to the connector for connection to the mobile communication device.

14. A method for diagnosing a patient, the method comprising:

activating on a smartphone a mobile phone software application for a universal personal diagnostic platform;

introducing a blood sample to a reader connected to the smartphone;

detecting an analyte in the blood sample;

collecting the data for the analyte; and transmitting the data for the analyte from the smartphone over a network;

wherein the universal personal diagnostic platform is physically connected to a connector for connection to the smartphone.

15. The method according to claim 14 further comprising receiving the data at a physician's computer device.

16. The method according to claim 14 further comprising receiving and storing the data at a server.

17. The method according to claim 15 further comprising receiving a prescription based on the data from a physician.

18. The method according to claim 14 further comprising diagnosing the patient's health.

19. The method according to claim 14 further comprising displaying the result within ranges, calculating an average level over a period of time and displaying graphs and charts of past test results.

* * * * *